Jan. 16, 1962 R. K. BREHM 3,016,787
AUTOMATIC LOCK FOR THE ROTATABLE MEMBERS OF INSTRUMENTS
FOR RECORDING CHANGES IN SIGNAL INTENSITIES
Filed June 22, 1960 2 Sheets-Sheet 2
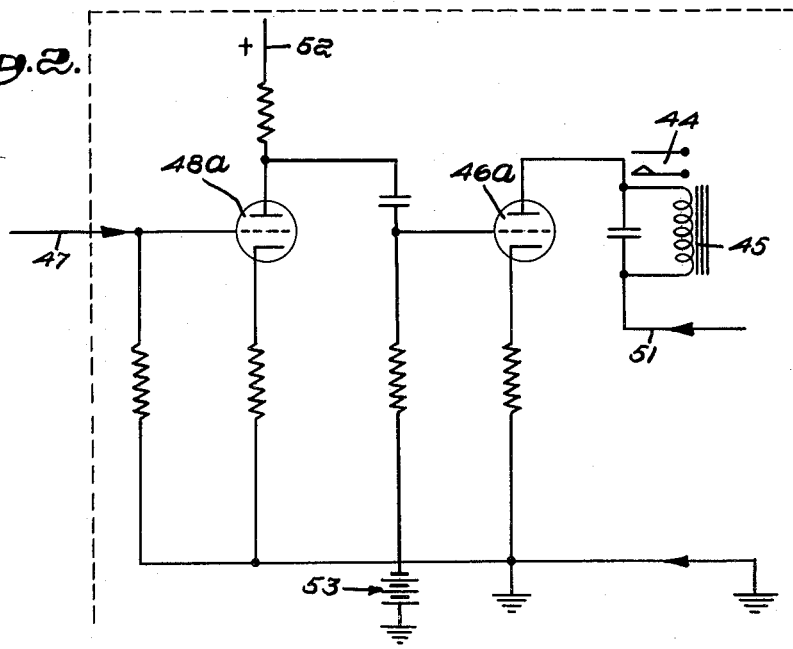
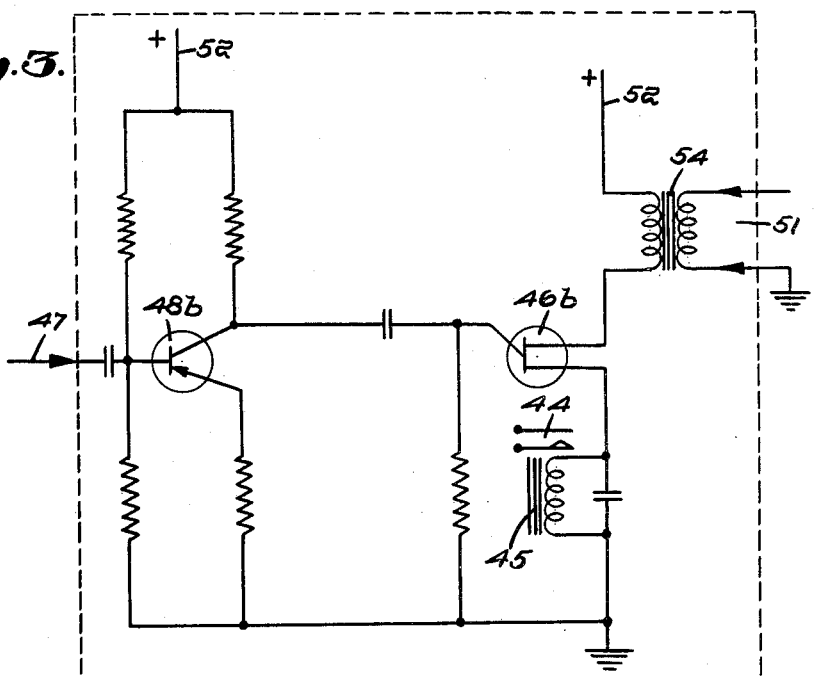
Inventor:
Richard K. Brehm,
by Abbot Spear
Attorney _United States Patent Office_  3,016,787
Patented Jan. 16, 1962

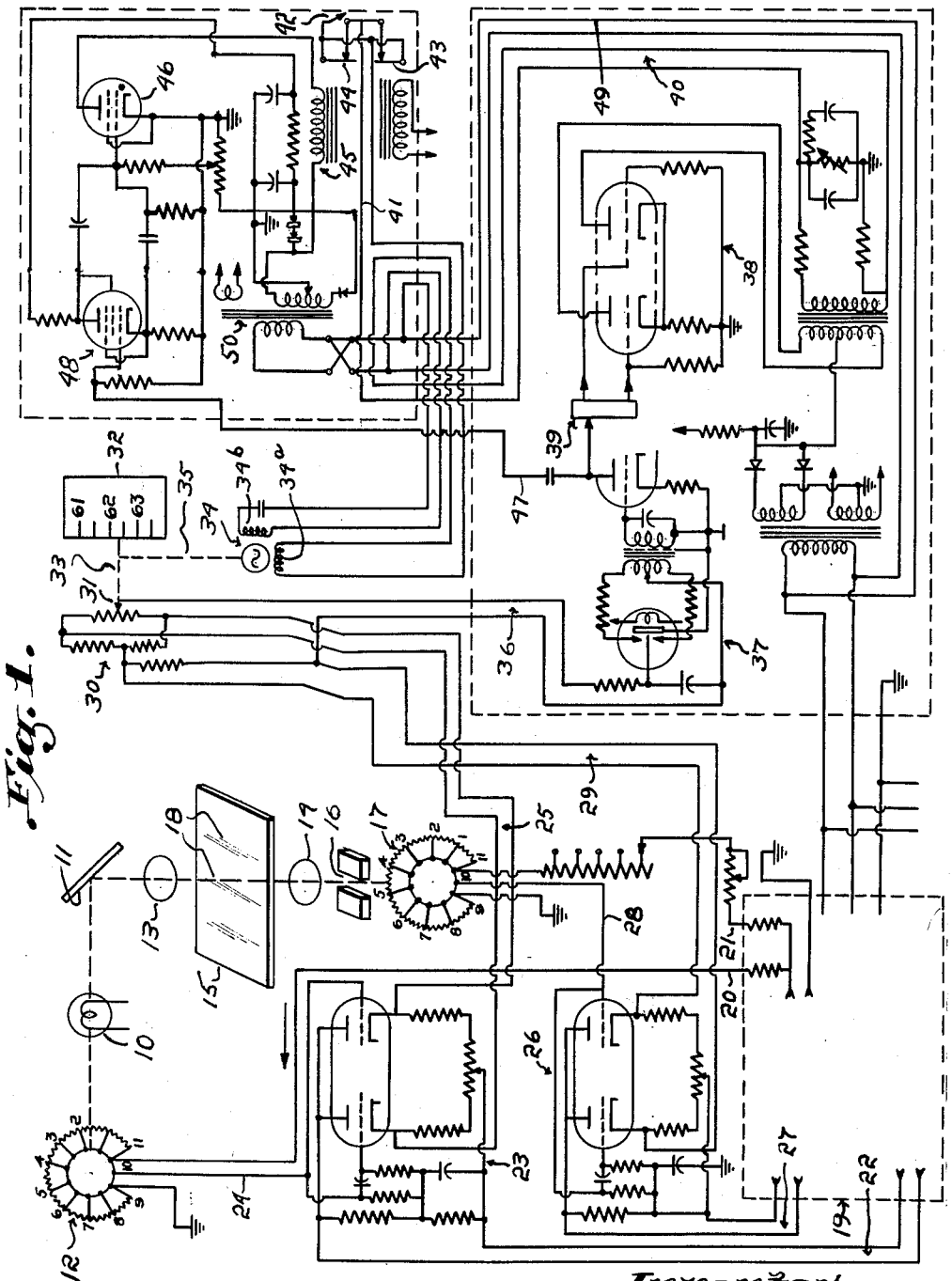

3,016,787
AUTOMATIC LOCK FOR THE ROTATABLE MEMBERS OF INSTRUMENTS FOR RECORDING CHANGES IN SIGNAL INTENSITIES
Richard K. Brehm, Lexington, Mass., assignor to Jarrell-Ash Company, Newtonville, Mass., a corporation of Massachusetts
Filed June 22, 1960, Ser. No. 38,076
8 Claims. (Cl. 88—14)

The present invention relates to instruments for recording changes in signal intensities and particularly to means operable to lock the scales of microphotometers automatically whenever minimum light transmission represents the densest part of any spectral line photographed on a transparency adapted to be projected. The present invention is a continuation in part of my copending application Serial No. 722,542, filed March 19, 1958, now abandoned.

In making photometric measurements of spectral lines, photographic plate or film having photographed, parallel spectral lines is passed through a projector with the lines in parallel with an exit slit through which light is beamed to a photosensitive detector. The output of the detector varies with the intensity of the transmitted light. By suitable means, such as servo mechanisms or meters, this output is employed to actuate continuously a scale bearing suitable indicia.

The operator of a microphotometer often must take substantial numbers of readings over long periods of time. The correctness of his readings depends on their being made, from the moving scale, at the precise moment light transmission is at the minimum value for the particular spectral line being projected and evalued. As a consequence, the taking of such readings is a tedious task demanding undivided attention throughout the test period.

The principal objective of the present invention is, accordingly, to provide means for locking the scale automatically in its position in which minimum light transmission is detailed as a photographed spectral line is passed by the exit slit.

This objective is attained by providing the combination of a scale actuated in response to and in proportion to the output of the photosensitive detector of a microphotometer, a control circuit, means for effecting reversal in phase in said control circuit when the direction of light intensity on said detector passes through a minimum when a spectral line on a transparency moves between the beam of the microphotometer projector and the parallel exit slit, a scale lock including a relay and a control element operatively connected to said control circuit and to said relay, said control element and relay being operable on said phase change to stop movement of said scale so that the operator may have whatever time he needs to make the necessary reading thus to make the microphotometric evaluation of photographed spectral line intensities easier and more accurate.

This objective is best attained when a continuously balanced potentiometer is used having a servo motor of the type having two windings and that is reversed in direction by a reversal of the phase relationship therebetween. Such potentiometers have the required control circuit for reversing the direction of the servo motor and the scale driven thereby. In accordance with the invention, at least the control circuit is used also in the scale locking circuit and the control element may be advantageously employed to open a circuit, such, for example, as that of the servo motor.

In the accompanying drawings, there are shown schematically illustrative embodiments of the invention from which these and other of its objectives, novel features, and advantages will be readily apparent.

In the drawings,
FIG. 1 is a schematic view of an embodiment of the invention in which the control element is a thyratron,
FIG. 2 is a fragmentary view illustrating an embodiment of the invention in which the control element is a vacuum tube, and,
FIG. 3 is a like view of another embodiment of the invention utilizing transistors.

In the embodiment of the invention shown in FIG. 1, a projection lamp 10 is so arranged relative to a mirror 11 and a photomultiplier tube 12 that its light strikes both of them. Light is reflected by the mirror 11 through suitable condensing and projecting lenses 13 and 14, respectively, between which the moving film or plate 15 passes. The drive for the film 15 is conventional and is neither shown nor described. The lenses 13, 14 focus beam through an exit slit 16 on a photomultiplier tube 17. The film 15 has spectral lines 18 of varying densities in parallel with each other and with the exit slit 16.

The photomultiplier tubes 12 and 17 are connected to the generally indicated D.C. power supply 19 by leads 20 and 21, respectively. The power supply 19 has a circuit 22 to a D.C. amplifier 23 whose voltage input through the lead 24 from the tube 12 varies directly with the intensity of the light from the lamp 10 thus to vary the amplifier output through the circuit 25. As the tube 12 responds only to the intensity of light from the projection lamp, it is sometimes herein referred to as the reference tube.

As the tube 17 repsonds to the intensity of the light passing through the film 15, it is sometimes referred to as the analytical tube.

A D.C. amplifier 26, connected as at 27 to the power supply 19, has an input lead 28 from the tube 17 so that the input voltage varies with the light intensity effective on the analytical tube 17. The amplifier output circuit is indicated at 29 and its voltage varies with the input voltage.

The circuits 25 and 29 are part of a conventional slide wire unit 30 whose slide wire is indicated at 31 and which has a scale 32 indicated as being mechanically linked thereto as at 33. The slide wire 31 and the scale 32 are driven together in both directions by a servo motor 34 through an indicated drive 35.

The combining of two varying voltages, one from the reference tube and the other from the analytical tube, provides a difference in D.C. voltage, relative to the slide wire setting, resulting in D.C. voltage being fed through a circuit 36 to a converter 37 adapted to change minute amounts of D.C. potential to an A.C. potential.

Since the scale 32 is mechanically driven by the servo motor 34 to balance any change of D.C. potential, D.C. voltage, applied to the converter 37, is only present for an instant until the servo motor 34 has made correction by changing the position of the slide wire 31 to compensate for the change in D.C. potential due to a change in light intensity applied to the analytical tube 17. During the instant that the D.C. potential is fed to the converter 37, an A.C. voltage output from the converter 37 is fed to an A.C. amplifier 38 through an indicated voltage amplifier and phase inverter 39 to effect a relatively large A.C. voltage output in the control phase circuit 40 of a relative phase corresponding to the direction in which the light intensity upon the analytical tube 17 is varying.

The control phase circuit 40 has a lead 41 to three parallel switches 42, 43 and 44. The closing of any of these switches is effective to apply current from the amplifier 38 to the servo motor windings 34a. The switch 42 is normally open and is for use when locking of the scale 32 is not wanted, while the switch 43 is also normally open and is actuated by the operator to start the motor 34 after a scale reading has been made. The switch 44 is automatically operated by the relay 45 to which current is fed by the thyratron 46 under conditions presently to be detailed. The converter 37 has a lead 47 to the A.C. voltage amplifier 48 which provides a signal of increased strength for the grid circuit of the thyratron 46. The reference phase circuit is indicated at 49 and it includes the fixed phase windings 34b of the motor 34 and the amplifier 50 to the thyratron plate circuit having leads 51 and 52. It will be appreciated that the frequency of the reference circuit times the operation of the converter so as to provide the necessary phase relation therebetween.

It will be appreciated that the reference and control phases are fed to the thyratron plate and control grid, respectively. Assume that initial adjustments have been made so that as the light intensity on the analytical tube 17 decreases, the thyratron control grid voltage is 180° out of phase as to the thyratron reference plate voltage. As a consequence, the thyratron is not fired during this part of a test.

At the precise instant that the light intensity begins to increase, the voltage phase of the thyratron control grid voltage reverses relative to its first mentioned value, consequently putting it in phase with the thyratron plate voltage. The thyratron, accordingly, instantly fires to energize the relay 45 opening the switch 44 to the servo motor and locking the scale 32 until either of the switches 42 or 43 is again closed.

In the embodiment of the invention illustrated by FIG. 2, there are shown vacuum tubes 48a and 46a, substituted for the amplifier tube 48 and the thyratron 46, respectively, and a battery 53 as illustrative of a fixed bias on the tube 46a. In the embodiment of the invention illustrated by FIG. 3, a standard transistor 48b replaces the amplifier tube 48 and a unijunction transistor 46b replaces the thyratron 46. The lead 50 includes a transformer 54. In both of these embodiments, the same control is effected.

What I therefore claim and desire to secure by Letters Patent is:

1. In a microphotometer of the type in which light from a projector is beamed through an exit slit on a photosensitive detector and in which a transparency having spectral lines is advanced through the projector with its lines in parallel with said slit to affect the output of said detector, the combination of a scale actuated in response to and in proportion to said detector output, a control circuit, means for effecting reversal in phase in said control circuit when the direction of light intensity on said detector passes through a minimum, a scale lock including a relay and a control element operatively connected to said control circuit and to said relay, said control element and relay being operable on said phase change to stop movement of said scale.

2. In a microphotometer of the type in which light from a projector is beamed through an exit slit on a photosensitive detector and in which a transparency having spectral lines is advanced through the projector with its lines in parallel with said slit to effect the output of said detector, the combination of a scale actuated in response to and in proportion to said detector output, a control circuit, means for effecting a predetermined change in phase in said control circuit when the direction of light intensity on said detector passes through a minimum, a scale lock including a relay and a control element operatively connected to said control circuit and to said relay, said control element and relay being operable on said phase change to stop movement of said scale.

3. In a microphotometer of the type in which light from a projector is beamed through an exit slit on a photosensitive detector of a continuously balanced potentiometer and in which a transparency having photographed spectral lines is advanced through the projector with its lines in parallel with said slit to energize said potentiometer in relation to light transmission, the combination of an A.C. servo motor included in said potentiometer and provided with two windings and reversing in direction on the shifting of the phase relation between them, reference and first and second control circuits, said reference and first control circuits being connected to appropriate ones of said windings, a scale driven by said motor, a scale lock comprising a normally closed switch in one of said circuits, a relay to open said switch, and a thyratron operatively connected to said relay, said second control circuit being connected to the grid thereof and said reference circuit being connected to the plate thereof so as to fire said thyratron on a 180° phase shift resulting from a voltage change representing a shift from decreasing to increasing light intensity.

4. In a microphotometer of the type in which light from a projector is beamed through an exit slit on a photosensitive detector of a continuously balanced potentiometer and in which a transparency having photographed spectral lines is advanced through the projector with its lines in parallel with said slit to energize said potentiometer in relation to light transmission, the combination of an A.C. servo motor included in said potentiometer and provided with two windings and reversing in direction on the shifting of the phase relation between them, reference and first and second control circuits, said reference and said first control circuit being connected to appropriate ones of said windings, a scale driven by said motor, a scale lock comprising a normally closed switch in one of said circuits, a relay to open said switch, and a thyratron operatively connected to said relay, said second control circuit including an amplifier and the grid of said thyratron and said reference circuit being connected to the plate thereof so as to fire said thyratron on a 180° phase shift resulting from a voltage change representing a shift from decreasing to increasing light intensity.

5. In a microphotometer of the type in which light from a projector is beamed through an exit slit on a photosensitive detector and in which a transparency having photographed spectral lines is advanced through the projector with its lines in parallel with said slit to effect the output of said detector, the combination of a scale continuously actuated in response to and in proportion to said detector output, a control circuit, means for effecting a change in phase of 180° in said control circuit when the direction of light intensity on said detector changes, a reference circuit with reference to which the phase changes in the control circuit are made, a scale lock including a relay, and a thyratron operatively connected to said relay, said control circuit being connected to the grid thereof and said reference circuit being connected to the plate thereof so as to fire said thyratron on a 180° phase shift resulting from a voltage change representing a shift from decreasing to increasing light intensity thereby to then prevent movement of said scale.

6. In a microphotometer of the type in which light from a projector is beamed through an exit slit on a photosensitive detector and in which a transparency having photographed spectral lines is advanced through the projector with its lines in parallel with said slit to effect the output of said detector, the combination of a scale continuously actuated in response to and in proportion to said detector output, a control circuit, means for effecting a change in phase of 180° in said control circuit when the direction of light intensity on said detector changes, a reference circuit with reference to which the phase changes in the control circuit are made, a scale lock including a relay, and a thyratron operatively connected to said relay, said control circuit including an amplifier and the grid of said thyratron and said reference circuit being connected to the plate thereof so as to fire said thyratron on a 180° phase shift resulting from a voltage change representing a shift from decreasing to increasing light intensity thereby to then prevent movement of said scale.

7. In an instrument for indicating the intensity of a signal, the combination of a signal detector, a rotatable member continuously actuated in response to and in proportion to said detector output, a control circuit, means for effecting a change in phase of 180° in said control circuit on changes in the direction of intensity of the signal detected by said detector, a reference circuit with reference to which the phase changes in the control circuit are made, means for interrupting the operation of said member including a relay, and a thyratron operatively connected to said relay, said control circuit being connected to the grid thereof and said reference circuit being connected to the plate thereof so as to fire said thyratron on a 180° phase shift resulting from a voltage change representing a shift in direction of the signal intensity.

8. In an instrument for indicating the intensity of a signal, the combination of a signal detector, a rotatable member continuously actuated in response to and in proportion to said detector output, a control circuit, means for effecting a change in phase of 180° in said control circuit on changes in the direction of intensity of the signal detected by said detector, a reference circuit with reference to which the phase changes in the control circuit are made, means for interrupting the operation of said member including a relay, and a thyratron operatively connected to said relay, said control circuit including an amplifier and the grid of said thyratron and said reference circuit being connected to the plate thereof so as to fire said thyratron on a 180° phase shift resulting from a voltage change representing a shift in the direction of the signal intensity.

References Cited in the file of this patent

UNITED STATES PATENTS

| | | |
|---|---|---|
| 2,565,265 | Peterson | Aug. 21, 1951 |
| 2,570,288 | Todd | Oct. 9, 1951 |
| 2,614,226 | Davis | Oct. 14, 1952 |